(12) United States Patent
Cha et al.

(10) Patent No.: US 11,597,300 B2
(45) Date of Patent: Mar. 7, 2023

(54) VEHICLE BODY

(71) Applicants:Hyundai Motor Company, Seoul (KR); Kia Motors Corporation, Seoul (KR)

(72) Inventors: Dong Eun Cha, Hwaseong-si (KR); Sang Heon Lee, Seoul (KR); Jin Ho Hwang, Cheonan-si (KR); Hyun Song, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 17/099,171

(22) Filed: Nov. 16, 2020

(65) Prior Publication Data

US 2022/0024353 A1 Jan. 27, 2022

(30) Foreign Application Priority Data

Jul. 23, 2020 (KR) .......................... 10-2020-0091771

(51) Int. Cl.
*B60N 2/005* (2006.01)
*B60N 2/90* (2018.01)
*B60H 1/00* (2006.01)
*B60N 3/00* (2006.01)
*B60R 7/04* (2006.01)
(Continued)

(52) U.S. Cl.
CPC ......... *B60N 2/005* (2013.01); *B60H 1/00564* (2013.01); *B60N 2/91* (2018.02); *B60N 3/001* (2013.01); *B60R 7/04* (2013.01); *B60R 11/0229* (2013.01); *B60S 1/56* (2013.01); *B60N 2/22* (2013.01); *B60R 2011/0012* (2013.01)

(58) Field of Classification Search
CPC ................ B62D 31/003; B62D 31/025; B60R 2011/0012; B60R 7/04; B60R 11/0229; B60N 2/005; B60N 2/91; B60N 2/012; B60N 3/001; B60H 1/00564; B60S 1/56
USPC .................... 296/24.34, 63, 64, 66, 65.03
See application file for complete search history.

(56) References Cited

U.S. PATENT DOCUMENTS 2,455,429 A * 12/1948 Lucien ................. B62D 31/025
280/124.136
7,568,759 B2 8/2009 Schurg
(Continued)

FOREIGN PATENT DOCUMENTS

| CN | 102285377 B | 6/2013 |
|---|---|---|
| CN | 104908829 A | 9/2015 |

(Continued)

OTHER PUBLICATIONS

Weng, Ying-jian, Machine Translation of CN 108382320, IP.com, Aug. 10, 2018 (Year: 2018).*
(Continued)

*Primary Examiner* — Jason S Morrow
*Assistant Examiner* — Wenwei Zhuo
(74) *Attorney, Agent, or Firm* — Morgan, Lewis & Bockius LLP (57) ABSTRACT

A vehicle body of a vehicle may include a floor portion which is provided for a driving unit of the vehicle to be mounted therein, and a seat frame member mounted with a seat of the vehicle while being selectively coupled to a plurality of points on the floor portion, to form the vehicle body, for achieving seat mounting and vehicle body configuration.

18 Claims, 6 Drawing Sheets

(51) Int. Cl.
  *B60R 11/02* (2006.01)
  *B60S 1/56* (2006.01)
  *B60N 2/22* (2006.01)
  *B60R 11/00* (2006.01)

(56) References Cited

U.S. PATENT DOCUMENTS

| | | | |
|---|---|---|---|
| 11,148,564 B1* | 10/2021 | Lee | B60N 2/876 |
| 2010/0187357 A1* | 7/2010 | Funke | B60N 3/001 |
| | | | 244/118.6 |
| 2011/0108666 A1* | 5/2011 | Pozzi | B64D 11/0649 |
| | | | 244/118.6 |
| 2017/0275940 A1* | 9/2017 | Yu | E05F 15/75 |
| 2020/0047692 A1* | 2/2020 | Park | G06Q 30/0283 |
| 2020/0055423 A1 | 2/2020 | Pruzzi et al. | |
| 2020/0062119 A1 | 2/2020 | Patil | |
| 2021/0237694 A1* | 8/2021 | Hirschvogel | B60J 7/16 |

FOREIGN PATENT DOCUMENTS

| | | | | |
|---|---|---|---|---|
| CN | 206870902 U | * | 1/2018 | |
| CN | 206870902 U | | 1/2018 | |
| CN | 108382320 A | * | 8/2018 | ......... B60R 11/0229 |
| DE | 102019118845 A1 | * | 1/2021 | ............... B60N 2/06 |
| EP | 3 613 638 A1 | | 8/2019 | |
| GB | 2504998 A | | 2/2014 | |
| JP | 2017065601 A | | 4/2017 | |
| KR | 10-1063456 B1 | | 9/2011 | |
| KR | 20200071784 A | | 6/2020 | |
| WO | WO 2019/081096 A1 | | 5/2019 | |

OTHER PUBLICATIONS

Hyundai Motor Company et al., European Search Report 20208534.6-1009, dated May 14, 2021.

* cited by examiner

VEHICLE BODY

CROSS-REFERENCE TO RELATED APPLICATION

The present application claims priority to Korean Patent Application No. 10-2020-0091771, filed on Jul. 23, 2020 in the Korean Intellectual Property Office, the entire contents of which is incorporated herein for all purposes by this reference.

BACKGROUND OF THE INVENTION

Field of the Invention

The present invention relates to a vehicle body of a vehicle capable of simultaneously forming vehicle body pillars through a combination of a plurality of seat frame members on an upper end portion of a skateboard type vehicle floor portion, and providing seats provided with independent spaces for passengers through the seat frame members.

Description of Related Art

When public mobility means based on mobility as a service (MaaS) become commercially available in the future, an individual may use the mobility means or many persons may simultaneously use the mobility means. In conventional cases, a large console such as a heating, ventilation and air conditioning (HVAC) console is centrally disposed in the interior of a vehicle such that front and rear seat spaces are separated from each other. In the instant case, the console occupies a large portion of the interior of the vehicle and then, space utility may be degraded. Furthermore, there may be a problem in that space separation may be achieved only between front and rear seats, and passenger space separation between left and right seats cannot be achieved.

Meanwhile, for manufacture of various types of vehicles optimized for various purposes, a skateboard platform has been provided together with vehicle electrification. However, it may be difficult for such a skateboard type floor to secure vehicle body stiffness maintenance and collision stability, which are achieved by a large number of members in conventional cases. For the present reason, a platform capable of satisfying various needs for stiffness using a minimum number of additional members is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle body of a vehicle in which the vehicle body is formed through a combination of a plurality of seat frame members provided at an upper end portion of a floor portion of the vehicle, front, rear, left and right seat spaces are separated from one another using partitions, and individual air conditioning ducts and displays are provided on a seat basis, and accordingly, passengers may comfortably receive mobility service in independent spaces, individually.

In accordance with an aspect of the present invention, the above and other objects may be accomplished by the provision of a vehicle body of a vehicle including a floor portion which is provided for a driving unit of the vehicle to be mounted therein, and a seat frame member mounted with a seat of the vehicle while being selectively coupled to a plurality of points on the floor portion, to form the vehicle body, for achieving seat mounting and vehicle body configuration.

The seat frame member may be coupled, at a lower end portion thereof, to a plurality of points on the floor portion, forming an annular vehicle body member. The annular vehicle body member may arrange in a width direction of the vehicle such that side portions of the annular vehicle body member form pillars of the vehicle. The seat of the vehicle may be mounted inside the annular vehicle body member.

The seat may include a seat cushion provided at a lower portion of the seat frame member inside the seat frame member and a seatback connected to a rear end portion of the seat cushion such that, when a passenger is accommodated on the seat, the passenger is surrounded by the seat frame member.

The vehicle body may further include a main roof member arranging in a longitudinal direction of the vehicle. The main roof member may form a vehicle body frame and may be coupled to points between upper end portions of a plurality of seat frame members.

A display may be provided at the seat frame member. An angle of the display may be varied in accordance with whether or not a passenger is accommodated on the seat or a reclining angle.

An individual air conditioning duct may be provided at an internal side surface of the seat frame member such that air conditioning directed to a passenger accommodated on the seat is achieved.

An individual air conditioning duct may be provided at the seat frame member along the annular vehicle body member such that air conditioning directed to a passenger accommodated on the seat is achieved in plural directions.

A side storage box may be provided at a left side or a right side of the seat frame member such that the side storage box may be selectively exposed.

The seat frame member may be provided in plural such that the plurality of seat frame members is disposed in a width direction of the vehicle while being connected to one another at facing side surfaces thereof. A side partition may be provided at a point between adjacent ones among the plurality of the seat frame members such that the side partition may be selectively exposed.

An auxiliary frame may be provided at a point spaced from the seat frame member in a forward or rearward direction such that a lower end portion thereof is coupled to the floor portion, forming the vehicle body together with the seat frame member.

An auxiliary partition may be provided at the auxiliary frame such that a periphery of the auxiliary partition is coupled to the auxiliary frame, to shield a front or rear side of the seat frame member. The auxiliary partition may have an upper plate and a lower plate.

When the upper plate of the auxiliary partition rotates in a horizontal direction, the upper plate may be used as a table. When the lower plate of the auxiliary partition rotates in a horizontal direction thereof when the upper plate does not rotate, the lower plate may be used as a seat cushion of an auxiliary seat, and the upper plate may be used as a seatback of the auxiliary seat.

The seat frame member may be provided in plural such that the plurality of seat frame members is spaced from one another in a longitudinal direction of the vehicle. A main door may be provided at a side surface between adjacent ones among the plurality of the seat frame members, to allow a passenger to enter or exit the vehicle therethrough.

A sub-door may be provided at a front portion or a rear portion of the vehicle such that the sub-door may be opened or closed while facing the seat frame member, to enable passengers to stow or retrieve goods in or from the vehicle through the sub-door and to enter or exit the vehicle through the sub-door in an emergency situation.

The vehicle may be an autonomous vehicle. A sensor housing may be provided at an upper end portion of the vehicle body, to receive a sensor for autonomous driving. The sensor may be extracted from the sensor housing upon operation of the sensor.

The sensor housing may be provided, at an internal surface thereof, with a sprayer and a cleaner. A washer solution may be injected from the sprayer when the sensor is positioned at an interior of the sensor housing. The cleaner may remove contaminants from a surface of the sensor when the sensor is extracted from the sensor housing.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
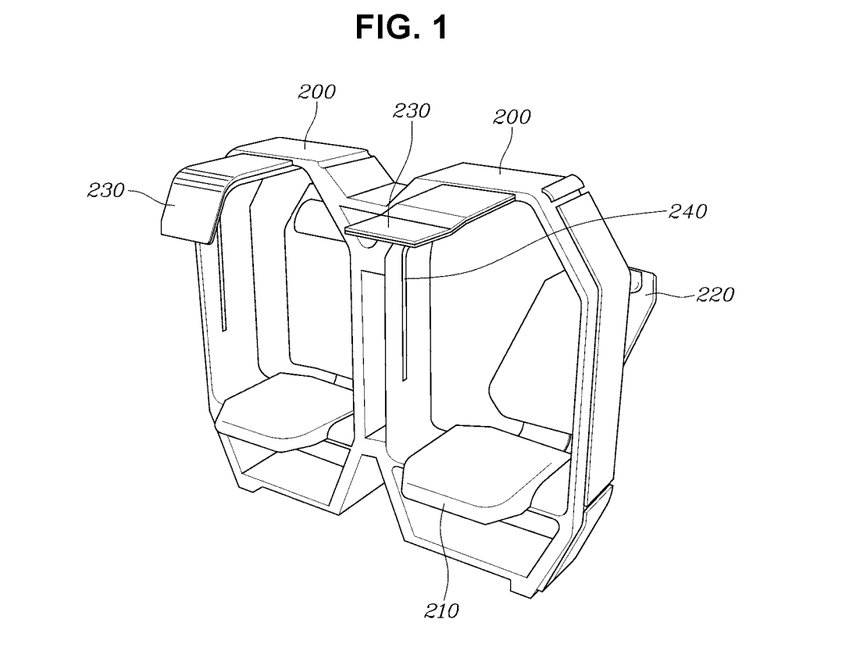
FIG. 1 is a view exemplarily illustrating a state in which two seat frame members in a vehicle body of a vehicle according to various exemplary embodiments of the present invention are coupled to each other.
Figure 2:
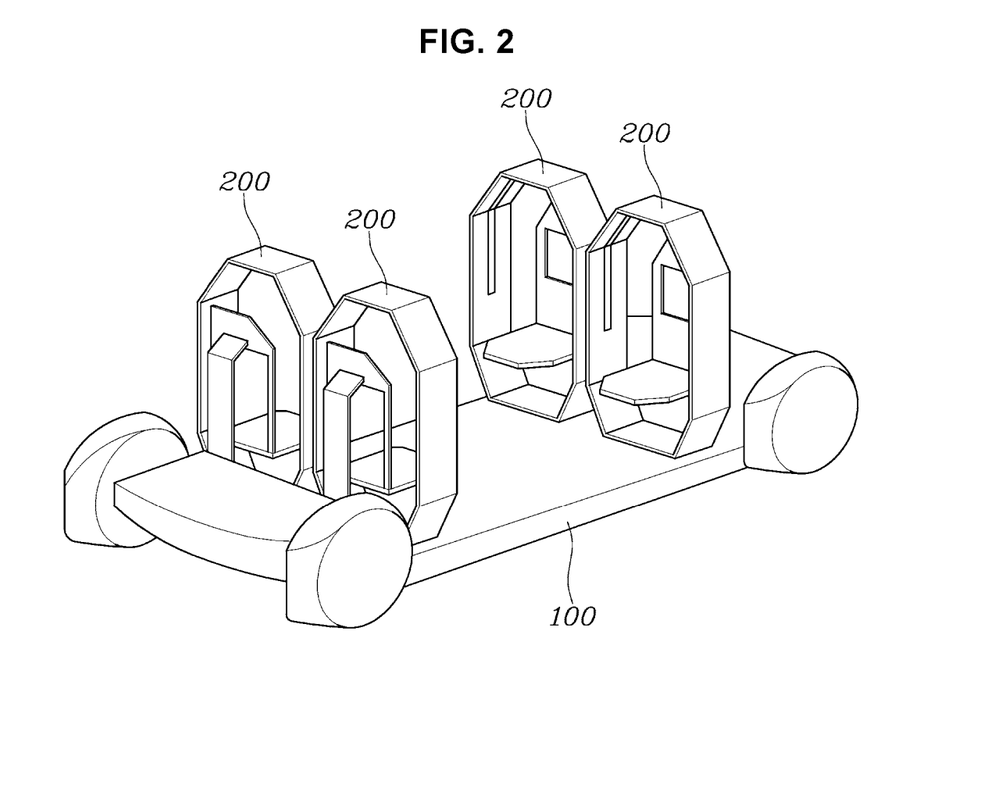
FIG. 2 is a view exemplarily illustrating a state in which the seat frame members are coupled to a floor portion in the vehicle body in accordance with the exemplary embodiment of the present invention.
Figure 3:
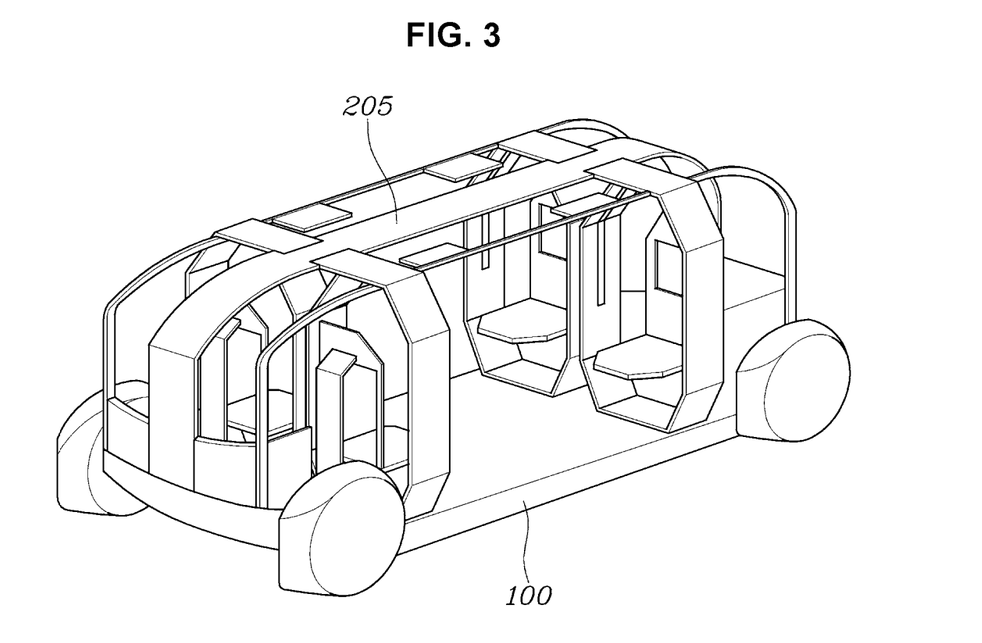
FIG. 3 is a view exemplarily illustrating a vehicle body frame having a main roof frame of the vehicle body and pillars of the vehicle having side portions of the seat frame members in accordance with various exemplary embodiments of the present invention.
Figure 4:
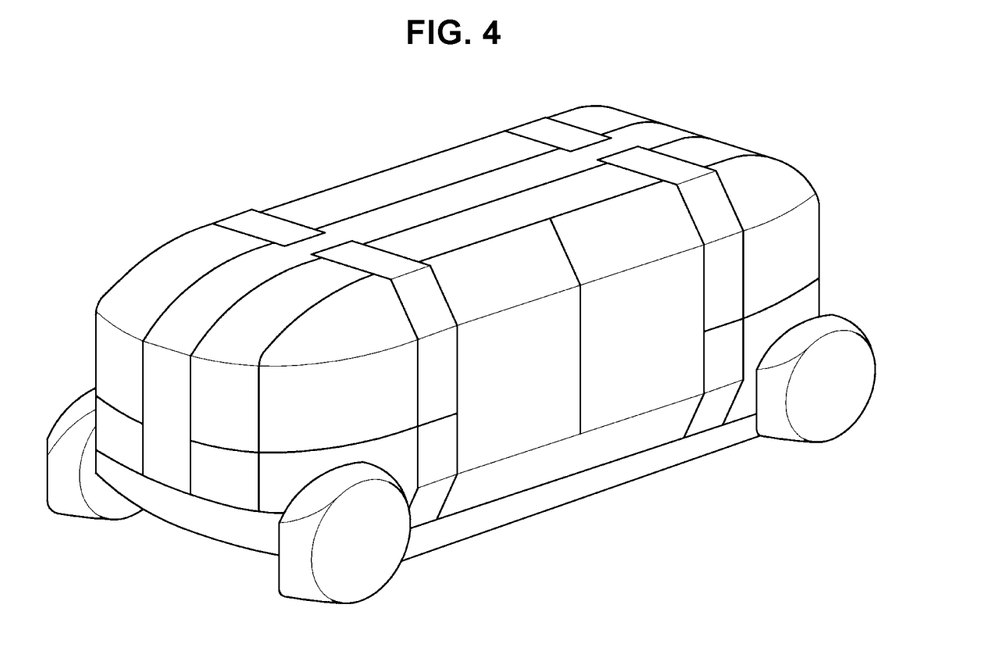
FIG. 4 is a view exemplarily illustrating a completed state of the vehicle body according to various exemplary embodiments of the present invention.
Figure 5:
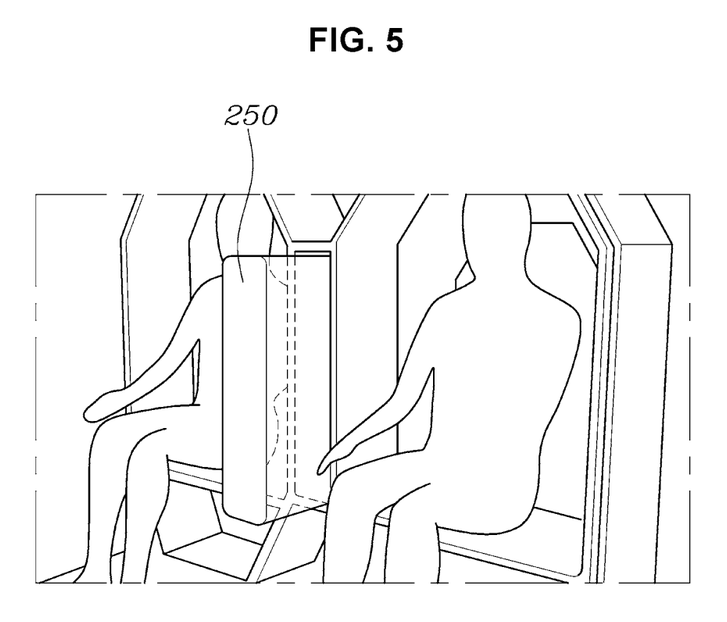
FIG. 5 is a view exemplarily illustrating a side storage space provided at a side surface of a seat frame member according to various exemplary embodiments of the present invention.
Figure 6:
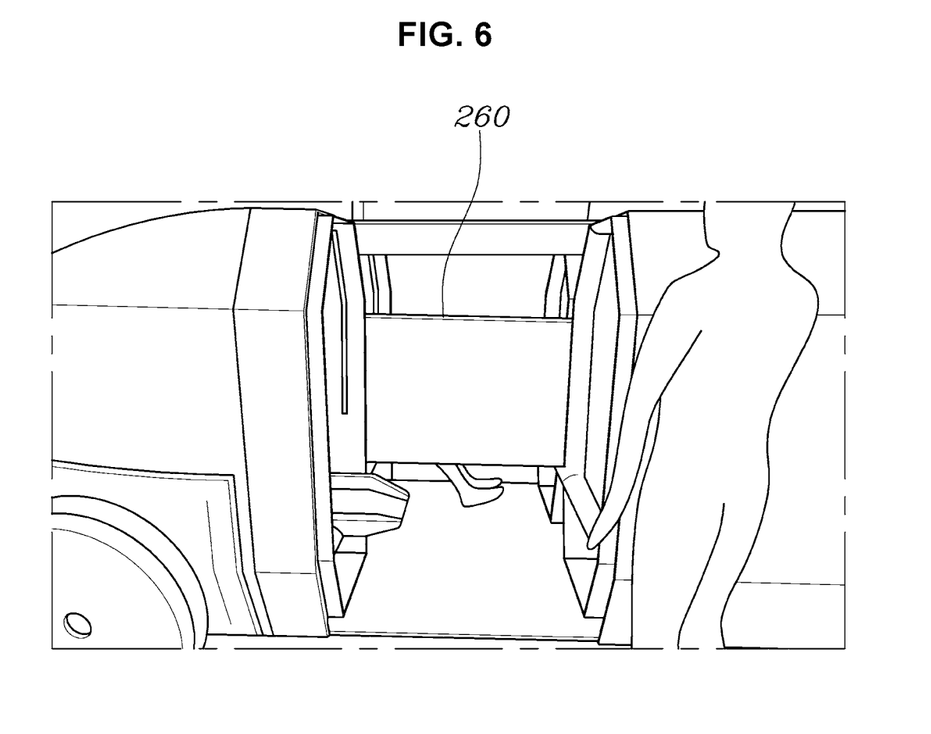
FIG. 6 is a view exemplarily illustrating a side partition provided between left and right seat frame members in accordance with various exemplary embodiments of the present invention.
Figure 7:
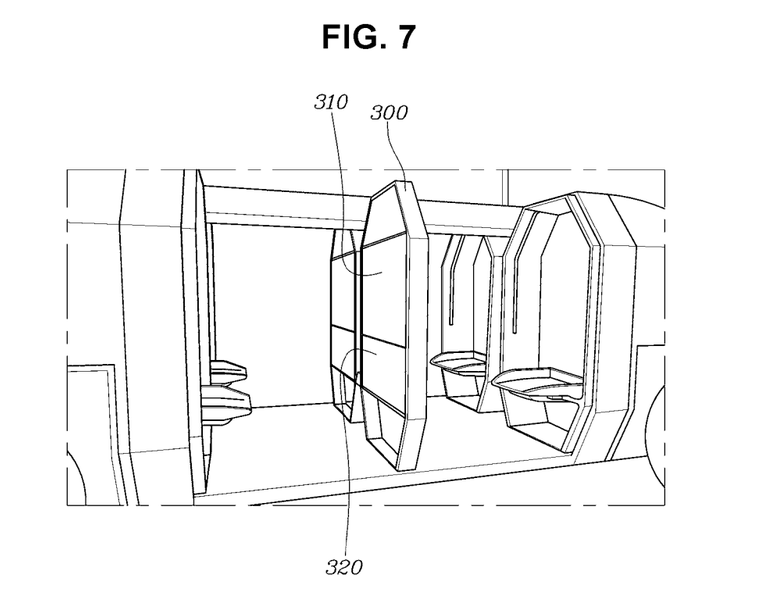
FIG. 7 is a view exemplarily illustrating an auxiliary frame provided with an auxiliary partition between front and rear seat frame members in accordance with various exemplary embodiments of the present invention.
Figure 8:
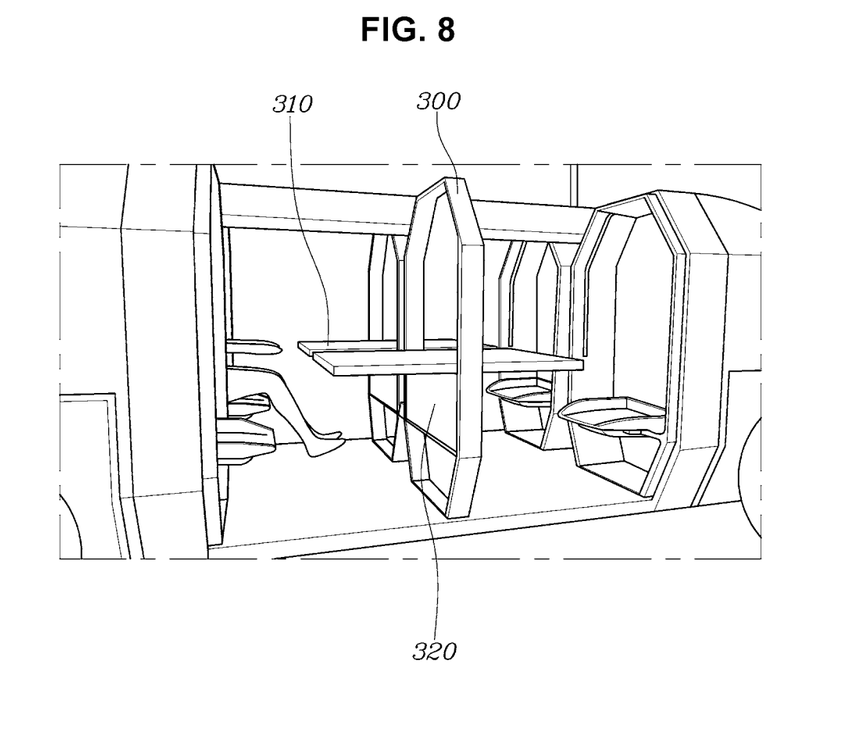
FIG. 8 is a view exemplarily illustrating a state in which an upper plate of the auxiliary partition according to the exemplary embodiment of the present invention is used as a table.
Figure 9:
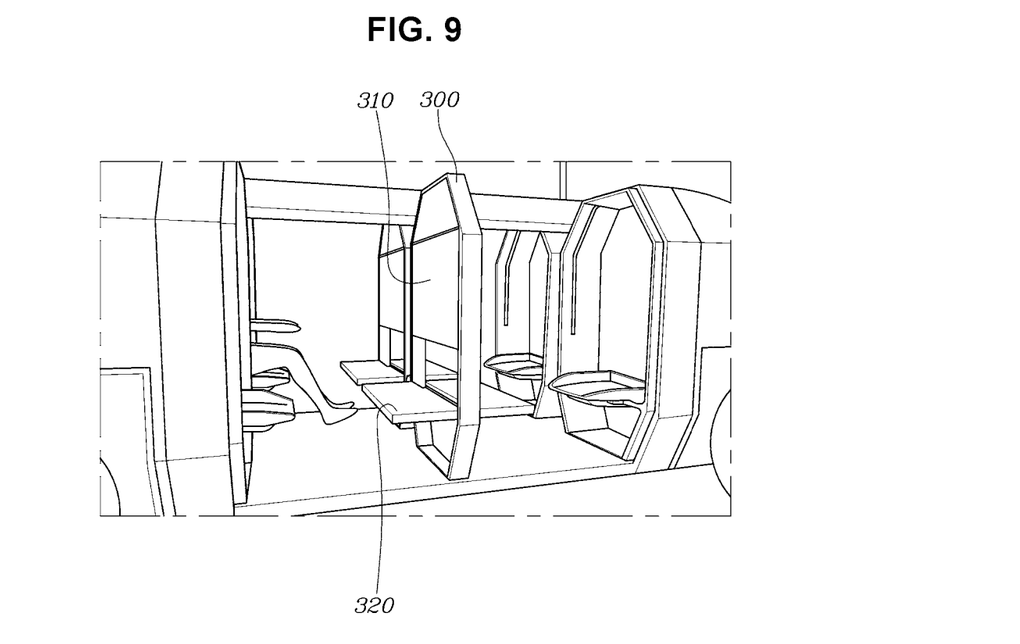
FIG. 9 is a view exemplarily illustrating a state in which a lower plate of the auxiliary partition according to the exemplary embodiment of the present invention is used as an auxiliary seat.
Figure 10:
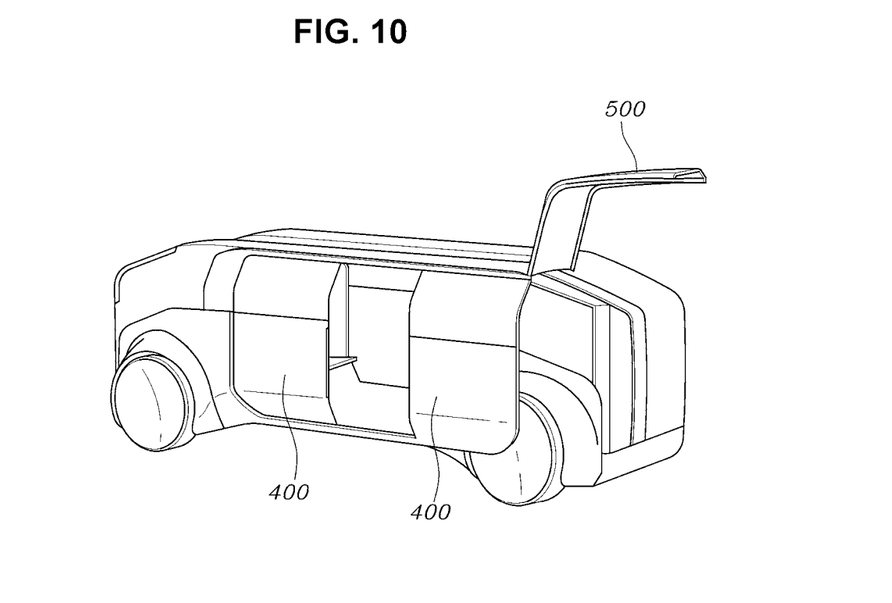
FIG. 10 is a view exemplarily illustrating a state in which a main door and a sub-door according to various exemplary embodiments of the present invention are opened.
Figure 11:
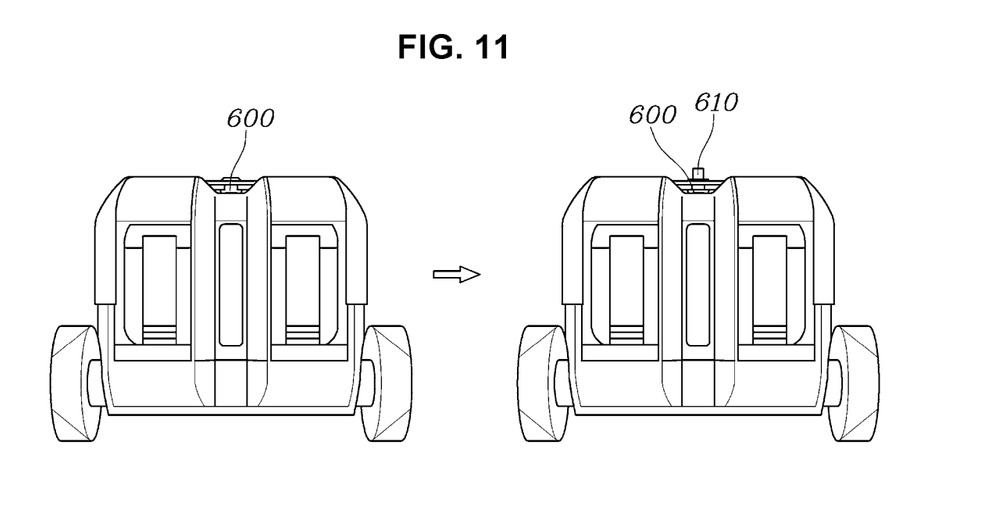
FIG. 11 is a view exemplarily illustrating a procedure in which a sensor operates after being extracted from a sensor housing in accordance with various exemplary embodiments of the present invention.
Figure 12:
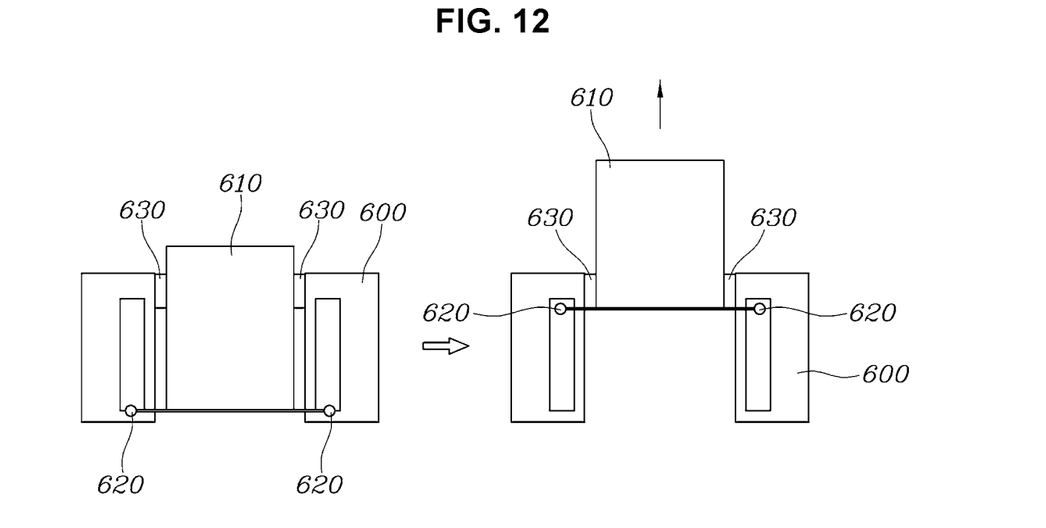
FIG. 12 is a view exemplarily illustrating a procedure in which the sensor is cleaned in the sensor housing in accordance with the exemplary embodiment of the present invention.

FIG. 1 is a view exemplarily illustrating a state in which two seat frame members in a vehicle body of a vehicle according to various exemplary embodiments of the present invention are coupled to each other. FIG. 2 is a view exemplarily illustrating a state in which the seat frame members are coupled to a floor portion in the vehicle body in accordance with the exemplary embodiment of the present invention. FIG. 3 is a view exemplarily illustrating a vehicle body frame having a main roof frame of the vehicle body and pillars of the vehicle having side portions of the seat frame members in accordance with various exemplary embodiments of the present invention. FIG. 4 is a view exemplarily illustrating a completed state of the vehicle body according to various exemplary embodiments of the present invention. FIG. 5 is a view exemplarily illustrating a side storage space provided at a side surface of a seat frame member according to various exemplary embodiments of the present invention. FIG. 6 is a view exemplarily illustrating a side partition provided between left and right seat frame members in accordance with various exemplary embodiments of the present invention. FIG. 7 is a view exemplarily illustrating an auxiliary frame provided with an auxiliary partition between front and rear seat frame members in accordance with various exemplary embodiments of the present invention. FIG. 8 is a view exemplarily illustrating a state in which an upper plate of the auxiliary partition according to the exemplary embodiment of the present invention is used as a table. FIG. 9 is a view exemplarily illustrating a state in which a lower plate of the auxiliary partition according to the exemplary embodiment of the present invention is used as an auxiliary seat. FIG. 10 is a view exemplarily illustrating a state in which a main door and a sub-door according to various exemplary embodiments of the present invention are open. FIG. 11 is a view exemplarily illustrating a procedure in which a sensor operates after being extracted from a sensor housing in accordance with various exemplary embodiments of the present invention. FIG. 12 is a view exemplarily illustrating a procedure in which the sensor is cleaned in the sensor housing in accordance with the exemplary embodiment of the present invention.

FIG. 1 illustrates a state in which two seat frame members in a vehicle body of a vehicle according to various exemplary embodiments of the present invention are coupled to each other. FIG. 2 illustrates a state in which the seat frame members are coupled to a floor portion in the vehicle body in accordance with the exemplary embodiment of the present invention. FIG. 3 illustrates a vehicle body frame having a main roof frame of the vehicle body and pillars of the vehicle having side portions of the seat frame members in accordance with various exemplary embodiments of the present invention. FIG. 4 illustrates a completed state of the vehicle body according to various exemplary embodiments of the present invention. The vehicle body of the vehicle according to the exemplary embodiment of the present invention includes a floor portion 100 provided with a driving unit of the vehicle, and a seat frame member 200 selectively coupled to a plurality of points on the floor portion 100 to form the vehicle body. A vehicle seat is mounted to the seat frame member 200. Accordingly, the seat frame member 200 simultaneously achieves seat mounting and vehicle body configuration. Here, the driving unit is a device configured for driving the vehicle, and accordingly, is a concept including all of a motor, an engine, driving wheels, etc.

Furthermore, the seat frame member 200 is coupled, at a lower end portion thereof, to a plurality of points on the floor portion 100, and accordingly, forms an annular vehicle body member. The annular vehicle body member may arrange in a width direction of the vehicle such that side portions thereof may form pillars of the vehicle, and a vehicle seat may be mounted inside the annular vehicle body member.

For manufacture of various types of vehicles optimized for various purposes, a skateboard platform has been provided together with vehicle electrification. In connection with this, to enable a skateboard type floor to secure vehicle body stiffness maintenance and collision stability in the vehicle body according to the exemplary embodiment of the present invention, the annular seat frame member 200 is disposed on the floor portion 100 of the vehicle to arrange in a width direction such that lateral stiffness is reinforced, and side portions of the annular seat frame member 200 function as pillars as in existing vehicle bodies. Accordingly, stiffness of the vehicle body may be secured, and vehicle design and manufacturing processes may be simplified through use of a minimum number of members.

Furthermore, since the vehicle frame is formed through coupling of the skateboard type floor portion 100 and the seat frame member 200, one or more seat frame members 200 may be conveniently mounted additionally to the floor portion 100 when mounting of a plurality of seat frame members 200 is required. Furthermore, when one or more seat frame members 200, which are additionally mounted, are unnecessary, the seat frame members 200 may be conveniently removed. On the other hand, when the length of the floor portion 100 is increased or decreased, the number of seat frame members 200 mounted to the floor portion 100 may be correspondingly increased or decreased. Accordingly, various vehicles may be conveniently designed and manufactured in accordance with purposes thereof. That is, vehicles including small cars, large-size vans and vehicles of specific purposes may be manufactured in a convenient manner in accordance with the vehicle body concept of the present invention.

Meanwhile, the seat in the vehicle body according to the exemplary embodiment of the present invention includes a seat cushion 210 provided at a lower portion of the seat frame member 200 inside the seat frame member 200, and a seatback 220 connected to a rear end portion of the seat cushion 210. Accordingly, when a passenger is accommodated on the seat, the passenger is surrounded by the seat frame member 200. As the seat is provided inside the annular seat frame member 200, the seat may be mounted to the vehicle body without using a cross member for seat mounting as in conventional cases, and accordingly, a manufacturing process may be simplified. In other words, although vehicles are manufactured through welding or painting on a vehicle basis in existing factories in conventional cases, assembly of a vehicle body is possible through fastening of the floor portion 100 and the seat frame member 200, which are delivered, for example, bolting, in accordance with various aspects of the present invention, and accordingly, vehicle manufacture utilizing a smart factory may be possible.

Furthermore, the vehicle body according to the exemplary embodiment of the present invention further includes a main roof member 205 arranging in a longitudinal direction of the vehicle. The main roof member 205 may form a vehicle body frame, and may be coupled to points between upper end portions of a plurality of seat frame members 200. In detail, the main roof member 205 is disposed at a center portion of the vehicle while arranging in the longitudinal direction of the vehicle, and accordingly, forms a vehicle body frame. When two or more seat frame members 200 are disposed, the main roof member 205 is disposed between the seat frame members 200 while being coupled to each seat frame member 200. In accordance with installation of the main roof member 205, the total stiffness of the vehicle is increased. Stiffness and collision stability of the vehicle body in forward and rearward directions are greatly increased. The seat frame members 200, which are coupled, at lower end portions thereof, to the floor portion 100, are also fixed at side surfaces thereof, and accordingly, stiffness of the seat in forward and rearward directions may be reinforced.

In other words, the main roof member 205 basically arranges along a roof in forward and rearward directions of the vehicle, as shown in the drawings. Front and rear end portions of the main roof member 205 are bent to be coupled to front and rear end portions of the floor portion 100, respectively, and accordingly, collision stiffness of the vehicle in forward and rearward directions is enhanced. Furthermore, the main roof member 205 is coupled to a point between upper end portions of a pair of seat frame members 200. In the instant case, each seat frame member 200 is fixed to the floor portion 100 at a lower end portion thereof while being fixed to the main roof member 205 at an upper end portion thereof. Accordingly, the upper and lower end portions of each seat frame member 200 are simultaneously fixed. Accordingly, enhanced stiffness may be secured. Furthermore, in the roof, the main roof member 205 and the seat frame members 200 form a lattice structure, and accordingly, total torsional rigidity of the vehicle may also be enhanced.

Meanwhile, a display 230 may be provided at the seat frame member 200 in the vehicle body. The angle of the display 230 may be varied in accordance with whether or not a passenger is accommodated on the seat or a reclining angle. Furthermore, the display 230 provided at the seat frame member 200 may be extracted or retracted in accordance with a desire of the passenger. Accordingly, the passenger may comfortably use the display 230 at various postures. When the display 230 is unused, the display 230 is retracted to be hidden, and accordingly, the passenger may freely move on the seat and from the seat.

Furthermore, in the vehicle body, an individual air conditioning duct 240 may be provided at an internal side surface of the seat frame member 200, and accordingly, air conditioning directed to the passenger accommodated on the seat may be achieved. The individual air conditioning duct 240 may be provided at the seat frame member 200 along the annular vehicle body member, and accordingly, air conditioning directed to the passenger accommodated on the seat may be achieved in plural directions. For example, when the individual air conditioning duct 240 is provided at the internal side surface of the seat frame member 200, air conditioning directed to the passenger may be achieved inside the seat frame member 200 around the passenger. In the instant case, desired air conditioning performance may be rapidly achieved, as compared to the case in which air conditioning directed to the passenger is achieved outside the seat frame member 200. Furthermore, it may be possible to control air conditioning at each seat frame member 200 in an individual manner. Furthermore, even when air conditioning is locally carried out without being unnecessarily carried out for all spaces of the vehicle, the passenger may feel sufficiently comfortable, and accordingly, enhanced efficiency may be provided in terms of energy consumption. Furthermore, when the individual air conditioning duct 240 is provided at the seat frame member 200 along the annular vehicle body member, more rapid air conditioning may be achieved because air conditioning is achieved in plural directions, as compared to the case in which the individual air conditioning duct 240 is provided at the internal side surface of the seat frame member 200. Furthermore, in the instant case, air is circulated inside the annular seat frame member 200, and accordingly, it may be possible to individually and more efficiently control air conditioning at each seat frame member 200.

FIG. 5 is a view exemplarily illustrating a side storage box provided at a side surface of the seat frame member in accordance with various exemplary embodiments of the present invention. FIG. 6 is a view exemplarily illustrating a side partition provided between left and right seat frame members in accordance with various exemplary embodiments of the present invention. A side storage box 250, which may be selectively exposed, may be provided at a left side or a right side of the seat frame member 200 in the vehicle body according to the exemplary embodiment of the present invention. Accordingly, the passenger may forwardly extract the side storage box 250 to store items in the side storage box 250, if necessary. After storage, the passenger may retract the side storage box 250 to secure a side space, and accordingly, may freely move.

Meanwhile, the seat frame member 200 is provided in plural such that the plurality of seat frame members 200 is disposed in a width direction of the vehicle while being connected to one another at facing side surfaces thereof. In the instant case, a side partition 260, which may be selectively exposed, may be provided at a point between the adjacent seat frame members 200. For example, when the side partition 260 is in an extracted state, the side partition 260 separates left and right seats from each other, providing independent spaces to passengers. When the side partition 260 is retracted, the left and right passengers may share a space with each other. Furthermore, it is expected that, when public mobility means become commercially available in the future, many persons will simultaneously utilize one mobility means. In the instant case, necessity of independent spaces will be further increased. Furthermore, when two seat frame members 200 are disposed side by side, the seat frame members 200 may form opposite pillars of the vehicle, respectively. In the instant case, the seat frame members 200 may also be coupled to each other such that the interiors thereof contact each other. Accordingly, lateral stiffness at the entire portion of the vehicle may be maintained.

FIG. 7 is a view exemplarily illustrating an auxiliary frame provided with an auxiliary partition between front and rear seat frame members in accordance with various exemplary embodiments of the present invention. FIG. 8 is a view exemplarily illustrating a state in which an upper plate of the auxiliary partition according to the exemplary embodiment of the present invention is used as a table. FIG. 9 is a view exemplarily illustrating a state in which a lower plate of the auxiliary partition according to the exemplary embodiment of the present invention is used as an auxiliary seat. In the vehicle body according to the exemplary embodiment of the present invention, an auxiliary frame 300 may be provided at a point spaced from the seat frame member 200 in a forward or rearward direction such that a lower end portion thereof is coupled to the floor portion 100. Accordingly, the auxiliary frame 300 forms the vehicle body together with the seat frame member 200. Furthermore, an auxiliary partition 310 or 320 may be provided at the auxiliary frame 300 such that the periphery of the auxiliary partition is coupled to the auxiliary frame 300. Accordingly, the auxiliary partition 310 or 320 shields a front or rear side of the seat frame member 200. The auxiliary partition 310 or 320 may have an upper plate 310 and a lower plate 320. Similarly to the above description, separation of front and rear seat spaces from each other may be possible using the auxiliary partition 310 or 320 provided at the auxiliary frame 300, as well as separation of left and right seat spaces from each other using the side partition 260. Accordingly, completely independent seat spaces may be provided to passengers, respectively, if necessary.

Meanwhile, when the upper plate 310 of the auxiliary partition rotates in a horizontal direction, the upper plate 310 may be used as a table. On the other hand, when the lower plate 320 of the auxiliary partition rotates in a horizontal direction under the condition that the upper plate 310 does not rotate, the lower plate 320 may be used as a seat cushion of an auxiliary seat, and the upper plate 310 may be used as a seatback of the auxiliary seat. As the auxiliary partition includes the upper plate 310 and the lower plate 320, the auxiliary partition may be used such that the upper plate 310 and the lower plate 320 are used as a table and an auxiliary seat in front of the seat, respectively, for convenience of passengers, in addition to the function of separating front and rear seats from each other. Furthermore, when the auxiliary partition has a plurality of sheets, the auxiliary partition may maintain the function of shielding seats in forward and rearward directions even when the upper plate 310 or the lower plate 320 is used as a table or an auxiliary seat at one of the seats.

FIG. 10 is a view exemplarily illustrating a state in which a main door and a sub-door according to various exemplary embodiments of the present invention are opened. In the vehicle body according to the exemplary embodiment of the present invention, the seat frame member 200 is provided in plural such that the plurality of seat frame members 200 is spaced from one another in the longitudinal direction of the vehicle. In the instant case, a main door 400 is provided at a side surface between the adjacent seat frame members 200 such that the main door 400 is disposed between the adjacent seat frame members 200. Accordingly, passengers may enter or exit the vehicle through the main door 400. The main doors 400 may be opened or closed in a butterfly manner, in a sliding manner, etc. The main doors 400 may be individually provided for respective seat frame members 200 such that passengers may independently enter or exit the vehicle through the individual main doors 400. A sub-door 500 may be provided at a front portion or a rear portion of the vehicle such that the sub-door 500 may be opened or closed while facing the seat frame member 200. Goods may be stowed or retrieved in or from the vehicle through the sub-door 500. In an emergency situation, passengers may enter or exit the vehicle through the sub-door 500. The sub-door 500 may be opened or closed in a flip-up manner. A passenger may open the sub-door 500 at the outside of the vehicle before entering the vehicle, to stow a load in a space between the sub-door 500 and the seat frame member 200. Although the sub-door 500 is smaller than the main door 400, passengers may enter or exit the vehicle through the sub-door 400 because the sub-door 400 is configured to be opened or closed while facing the seat frame member 200. Accordingly, there is an advantage in that, in an emergency situation in which passengers cannot enter or exit the vehicle through the main door 400, passengers may enter or exit the vehicle through the sub-door 400.

Meanwhile, a small space may be provided between the seat frame member 200 and the sub-door 400 facing the seat frame member 200 at the front or rear portion of the vehicle such that the small space faces the side storage space 250 of the seat frame member 200. A small storage space may be provided in the small space such that the small storage space may be opened or closed at the outside thereof. In the small storage space, necessary goods such as an emergency medical kit and personal mobility products may be stored.

FIG. 11 is a view exemplarily illustrating a procedure in which a sensor operates after being extracted from a sensor housing in accordance with various exemplary embodiments of the present invention. FIG. 12 is a view exemplarily illustrating a procedure in which the sensor is cleaned in the sensor housing in accordance with the exemplary embodiment of the present invention. The vehicle according to the exemplary embodiment of the present invention is an autonomous vehicle. A sensor housing is provided at an upper end portion of the vehicle body of the vehicle, to receive a sensor for autonomous driving. The sensor may be extracted from the sensor housing upon operation of the sensor. When an autonomous vehicle becomes commercially available in the future, a space, in which various sensors for autonomous driving may be mounted, may be necessary. To this end, the vehicle body according to the exemplary embodiment of the present invention may be provided with a sensor housing 600 at an upper end portion thereof. A sensor 610 is received in the sensor housing 600. If necessary, the sensor 610 is extracted in a pop-up driving manner so that the sensor 610 may operate. For the sensor 610, for example, various sensors such as a camera, a radar and a Light Detection and Ranging (LiDAR) may be applied.

Furthermore, the sensor housing 600 may be disposed inside an upper end portion of the vehicle, in detail, an upper end portion of the main roof member 205. When the sensor housing 600 is disposed at the main roof member 205 forming the frame of the vehicle body, the sensor housing 600 may be more securely fixed, as compared to the case in which the sensor housing 600 is separately provided at the upper end portion of the vehicle body. In the instant case, there may be an advantage in terms of stiffness, durability, stability, etc. In association with protection of the sensor 610.

Meanwhile, a sprayer 610 and a cleaner 630 may be provided at an internal surface of the sensor housing 600. When the sensor 610 is positioned in the interior of the sensor housing 600, a washer solution is injected from the sprayer 620. When the sensor 610 is extracted from the sensor housing 600, the cleaner 630 may remove contaminants from a surface of the sensor 610. The sensor 610 is a very important constituent element for autonomous driving. Of course, when the sensor 610 is contaminated due to surrounding environments, the sensor 610 may malfunction or fail. To avoid or solve the above-described problem, a cleaning system for the sensor 610 is essentially required. To this end, the vehicle body according to the exemplary embodiment of the present invention is provided with a cleaning system for the sensor 610. Before the autonomous vehicle sets out or when the autonomous vehicle is in a state of being contaminated due to surrounding environments, the sensor 610 is temporarily retracted into the sensor housing 600. In the interior of the sensor housing 600, the sprayer 620 injects a washer solution toward the sensor 610. When the sensor 610 is again extracted, the surface of the sensor 610 is wiped using the cleaner 630 disposed at an upper end portion of the sensor housing 600. Through the above-described procedure, the sensor 610 in the autonomous vehicle is always maintained in a clean state, and accordingly, may effectively provide data to the vehicle during autonomous driving without malfunction.

In accordance with exemplary embodiments of the present invention, it may be possible to provide a vehicle body of a vehicle in which the vehicle body is formed through a combination of a plurality of seat frame members provided at an upper end portion of a floor portion of the vehicle, front, rear, left and right seat spaces are separated from one another using partitions, and individual air conditioning ducts and displays are provided on a seat basis, and accordingly, passengers may comfortably receive mobility service in independent spaces, individually.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle body of a vehicle, the vehicle body comprising:
   a floor portion which is provided for a driving unit of the vehicle to be mounted therein; and
   a seat frame member mounted with a seat of the vehicle while being selectively coupled to a plurality of points on the floor portion, to form the vehicle body, for achieving seat mounting and vehicle body configuration,
   wherein an individual air conditioning duct is provided at an internal side surface of the seat frame member so that air conditioning directed to a passenger accommodated on the seat is achieved.

2. The vehicle body according to claim 1,
   wherein a lower end portion of the seat frame member is coupled to the plurality of points on the floor portion, forming an annular vehicle body member;
   wherein the annular vehicle body member is disposed in a width direction of the vehicle so that side portions of the annular vehicle body member form pillars of the vehicle; and
   wherein the seat of the vehicle is mounted inside the annular vehicle body member.

3. The vehicle body according to claim 1, wherein the seat includes a seat cushion provided at a lower portion of the seat frame member inside the seat frame member and a seatback connected to a rear end portion of the seat cushion so that, when the passenger is accommodated on the seat, the passenger is surrounded by the seat frame member.

4. The vehicle body according to claim 1,
   wherein a display is provided at the seat frame member; and
   wherein an angle of the display is varied in accordance with whether the passenger is accommodated on the seat or the seat is tilted in a reclining angle.

5. The vehicle body according to claim 2, wherein the individual air conditioning duct is provided at the seat frame member along the annular vehicle body member so that the air conditioning directed to the passenger accommodated on the seat is achieved in plural directions.

6. The vehicle body according to claim 1, wherein a side storage box is provided at a left side or a right side of the seat frame member so that the side storage box is selectively exposed.

7. The vehicle body according to claim 1,
   wherein the seat frame member is provided in plural to form a plurality of seat frame members so that the plurality of seat frame members is disposed in a width direction of the vehicle while being connected to one another in facing side surfaces of the plurality of seat frame members; and
   wherein a side partition is provided at a point between adjacent ones among the plurality of the seat frame members so that the side partition is selectively exposed.

8. The vehicle body according to claim 1, wherein an auxiliary frame is provided at a point spaced from the seat frame member in a forward or rearward direction of the vehicle so that a lower end portion of the seat frame member is coupled to the floor portion, forming the vehicle body with the seat frame member.

9. The vehicle body according to claim 8,
   wherein an auxiliary partition is provided at the auxiliary frame so that a periphery of the auxiliary partition is coupled to the auxiliary frame, to shield a front or rear side of the seat frame member; and
   wherein the auxiliary partition includes an upper plate and a lower plate.

10. The vehicle body according to claim 9, wherein the upper plate and the lower plate are rotatably mounted on the auxiliary frame.

11. The vehicle body according to claim 10,
    wherein when the upper plate of the auxiliary partition rotates in a horizontal direction thereof, the upper plate is used as a table;
    wherein when the lower plate of the auxiliary partition rotates in a horizontal direction thereof when the upper plate does not rotate, the lower plate is used as a seat cushion of an auxiliary seat, and the upper plate is used as a seatback of the auxiliary seat.

12. The vehicle body according to claim 1,
    wherein the seat frame member is provided in plural to form a plurality of seat frame members so that the plurality of seat frame members is spaced from one another in a longitudinal direction of the vehicle.

13. The vehicle body according to claim 12,
    wherein a main door is provided at a side surface between adjacent ones among the plurality of the seat frame members, to allow the passenger to enter or exit the vehicle therethrough.

14. The vehicle body according to claim 1, wherein a sub-door is provided at a front portion or a rear portion of the vehicle so that the sub-door is opened or closed while facing the seat frame member, to enable passengers to stow or retrieve goods in or from the vehicle through the sub-door and to enter or exit the vehicle through the sub-door in an emergency situation.

15. The vehicle body according to claim 1,
    wherein the vehicle is an autonomous vehicle;
    wherein a sensor housing is provided at an upper end portion of the vehicle body, to receive a sensor for autonomous driving of the vehicle; and
    wherein the sensor is extracted from the sensor housing upon operation of the sensor.

16. The vehicle body according to claim 15,
    wherein the sensor housing is provided with a sprayer and a cleaner at an internal surface of the sensor housing;
    wherein a washer solution is injected from the sprayer when the sensor is disposed at an interior of the sensor housing; and
    wherein the cleaner removes contaminants from a surface of the sensor when the sensor is extracted from the sensor housing.

17. The vehicle body according to claim 1,
    wherein a sensor housing is provided at an upper end portion of the vehicle body, to receive a sensor therein;
    wherein the sensor is extracted from the sensor housing upon operation of the sensor; and wherein the sensor housing is provided with a sprayer and a cleaner at an internal surface of the sensor housing.

18. The vehicle body according to claim 1, further including:
   a main roof member arranging in a longitudinal direction of the vehicle,
   wherein the seat frame member is provided in plural to form a plurality of seat frame members, and
   wherein the main roof member forms a vehicle body frame and is coupled to points between upper end portions of the plurality of seat frame members.

* * * * *